United States Patent [19]
Canevari

[11] 4,022,288
[45] May 10, 1977

[54] SERIES TWIN LEAF SPRING WEIGHING SCALE

[75] Inventor: Louis T. Canevari, Norwalk, Conn.
[73] Assignee: Pitney-Bowes, Inc., Stamford, Conn.
[22] Filed: Feb. 27, 1976
[21] Appl. No.: 661,981
[52] U.S. Cl. .............................................. 177/229
[51] Int. Cl.² ....................................... G01G 3/08
[58] Field of Search .......................... 177/229–231, 177/169

[56] References Cited
UNITED STATES PATENTS

| 2,646,274 | 7/1953 | Weckerly | 177/229 X |
| 2,969,228 | 1/1961 | Appius | 177/229 |
| 3,026,954 | 3/1962 | Appius | 177/229 X |
| 3,080,936 | 3/1963 | Sher et al. | 177/229 X |
| 3,191,702 | 6/1965 | Kohlhagen | 177/229 |
| 3,667,560 | 6/1972 | Cooke | 177/229 X |
| 3,807,517 | 4/1974 | Freeman | 177/229 X |

Primary Examiner—George H. Miller, Jr.
Attorney, Agent, or Firm—William D. Soltow, Jr.; Albert W. Scribner; Robert S. Salzman

[57] ABSTRACT

A twin leaf spring weighing scale, wherein the leaf springs are connected to each other in tandem about a common support. One of the leaf springs is angled above a horizontal axis, so as to deflect downwardly with an increasing effective bending length. The other leaf spring is positioned along a horizontal axis to provide a decreasing effective bending length as it deflects downwardly. The two leaf springs act together to provide a unitized leaf spring structure that has a constant spring rate throughout the weighing range of the scale.

12 Claims, 2 Drawing Figures

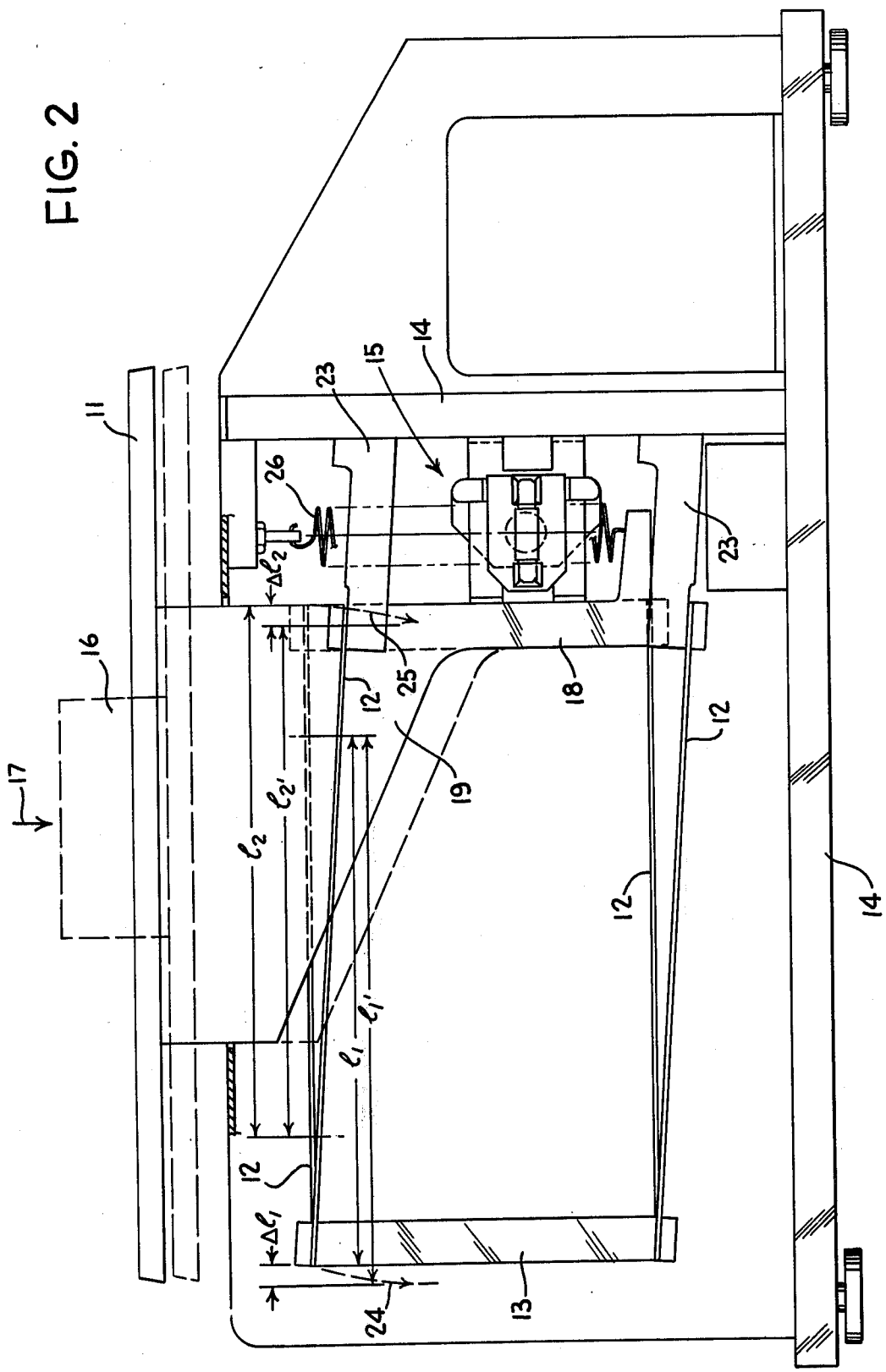

ature of this invention to provide a
SERIES TWIN LEAF SPRING WEIGHING SCALE

This invention pertains to leaf spring weighing scales, and more particularly to a leaf spring scale that has a constant spring rate throughout its weighing range.

BACKGROUND OF THE INVENTION

Heretofore, leaf spring scales have been fabricated with a tandem construction so as to provide straight line motion, i.e. a substantially vertical deflection having little or no lateral play.

This type of construction can be seen with reference to Patent Nos:
2,105,514 (1971) GERMANY
2,646,274 WECKERLY
2,969,228 APPIUS
3,026,954 APPIUS
3,667,560 COOKE With the increasing demand for scales of higher and higher accuracies, it has been found that a significant distortion takes place in the spring rate of leaf spring scales of the above type. As the leaf springs deflect, they traverse a slight arc, that causes their effective bending lengths to be altered. This has the effect of changing the spring constant of the scale as the springs deflect. Where high accuracy is required, this distortion cannot be tolerated.

While it was known to prestress or prebend the springs to minimize these aberrations, a constant spring rate scale never has been achieved.

It has been found that by angling one spring portion of the multiple spring scale above the horizontal, and angling a corresponding spring portion along a horizontal axis, one deflection arc will be increasing at the same time the other deflecting arc is descreasing. If both spring portions are united about a common support, such that they act as a unitized spring, the bending length distortions in each spring portion will cancel each other throughout the deflecting range. This then, will have the effect of providing a total spring structure with a constant spring rate (an invarying spring constant throughout the weighing ranges).

SUMMARY OF THE INVENTION

The invention relates to a multiple leaf spring scale having a combination of leaf springs, that are arranged to provide a substantially constant spring rate throughout a scale weighing range.

When a load is placed on the weighing pan of the scale, the pan and the supporting leaf springs will deflect downwardly through a portion of the weighing range. The leaf springs are arranged as a unitized structure, i.e. they are connected in tandem about a common support. One portion of the unitized leaf spring structure has an increasing effective bending length throughout the weighing range, while a corresponding portion has a corresponding decreasing effective bending length throughout the same deflection.

The two spring portions are made identical in all other respects. Therefore, the changes in the spring constant for one portion will effectively be cancelled by the corresponding changes of the other portion. As a result, the combined spring rate will experience no change.

It is an object of this invention to provide an improved leaf spring scale; and

It is another object of the invention to provide a multiple leaf spring scale, wherein the leaf springs are combined to effect a substantially constant spring rate throughout the weighing range.

These and other objects of this invention will be better understood and become more apparent with reference to the following detailed description taken in conjunction with the attached drawings, in which:

FIG. 2 is a front view of FIG. 1.

Figure 1:
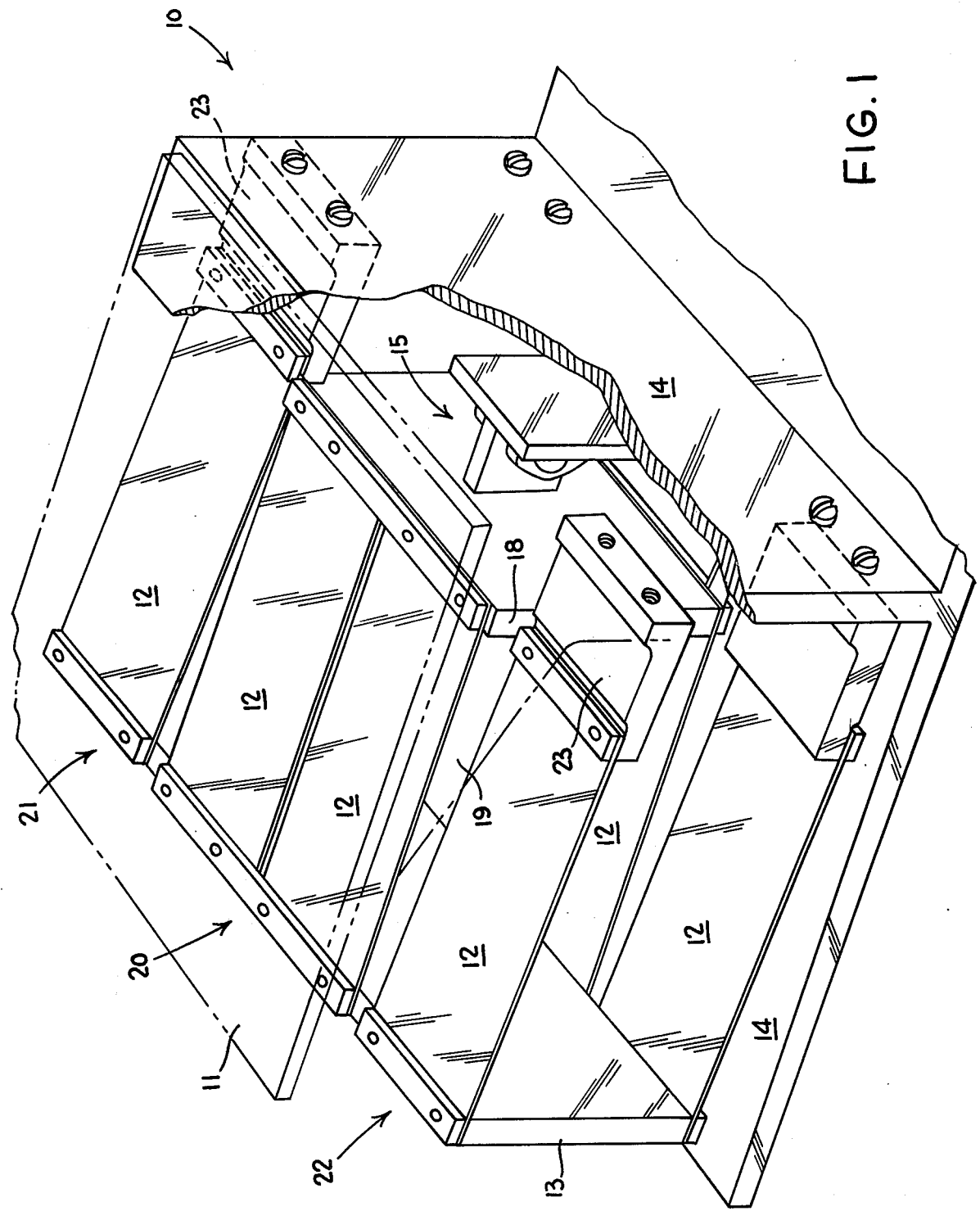
FIG. 1 is a perspective view of the leaf spring scale of this invention.

The invention will be explained with reference to FIGS. 1 and 2. These figures show a box-like leaf spring scale generally represented by arrow 10. The scale basically consists of a weighing pan 11, a combination of leaf spring strips 12, a common spring support 13, a scale frame 14, and a deflection measuring apparatus 15.

For most leaf spring scales, the spring constant K is usually given by the following equation:

$$K = t^3 EW/l^3$$

where:
$t$ is the thickness of the leaf springs;
$E$ is Young's Modulus for the springs;
$W$ is the width of the leaf springs; and
$l$ is the length of the leaf springs.

It will be evident from the above equation that where the thickness ($t$), Young's Modulus ($E$), and width ($W$) are kept constant, the only parameter effecting the spring constant is the length ($l$).

In leaf spring scales, the leaf springs are usually anchored about a frame support, and are pivotable about this supported end. The effective bending length of the springs tend to change as the springs deflect, because the outer movable end of the springs travel through an arc. The change in effective bending length, and hence, the change in spring constant K, becomes a function of the cosine of the arc angle.

The invention is predicated upon the concept, that in a multiple arrangement of leaf springs, the springs can be combined in such a way as to cancel any change in the spring constant. In other words, a portion of the spring combination will be fabricated to have a negative change in spring rate, while a complementary portion of the spring combination will have a correspondingly positive change throughout a weight deflection range.

Referring again to the figures, the pan 11 is caused to deflect (arrow 17) to a position shown by the phantom lines in Fig. 2, under the influence of load 16. The pan 11 is connected to a movable spring support 18 via a cross bar 19. The movable spring support 18 cooperates with the other movable spring support 13 to form two twin parallelogram structures with spring strips 12.

There are eight leaf spring strips in the inventive construction. Other constructions are possible, however, within the limits of the inventive concept. This particular arrangement of leaf springs is also designed to reduce bending distortions due to lateral shifts of the load 16 upon pan 11.

The inventive spring design has an inner leaf spring parallelogram 20 (FIG. 1) which comprises two upper and two lower spring strips 12. This portion of the spring construction has a decreasing spring constant, as will be further explained with reference to FIG. 2. Two outer spring parallelograms 21 and 22 are positioned on either side of parallelogram 20 as shown. This portion of the spring construction has an increasing spring constant.

Support 13 joins the parallelograms 21 and 22 to the parallelogram 20 in a tandem fashion. Springs 12 of parallelograms 21 and 22 are joined to the frame 14 by means of frame extensions 23.

As will be evident from the figures, the springs 12 of the outer parallelograms 21 and 22 extend at an upward angle from the horizontal. The springs 12 of the inner parallelogram 20 extend coincident with the horizontal axis.

Each spring strip will have an effective bending length defined as approximately 80% of the total structural length. The outer parallelograms 21 and 22 have an effective bending length defined by "$l^1$", (FIG. 2) in the rest condition (no deflection). As the pan 11 is caused to deflect, the springs 12 of the outer parallelograms will deflect through an increasing arc shown by arrow 24. The effective bending length of these springs will increase in length by an amount defined as $\Delta l_1$. The new increased spring length is defined as $l_1'$.

As the outer parallelograms deflect the inner parallelogram also deflects, because both inner and outer parallelograms are supported upon the common movable support 13.

The inner parallelogram 20 has spring strips 12 that have an effective bending length $l_2$ in the rest position. When the pan deflects, these springs deflect through a decreasing arc 25 (FIG. 2). The inner springs 12 will then decrease in length by an amount $\Delta l_2$. The new decreased spring length is now given as $l_2'$.

If all the springs 12 (both inner and outer parallelograms) are made the same, i.e. have the same parameters of length, width, and Young's Modulus, then it follows for all deflection positions in the weighing range, that:

$$\Delta l_1 = - \Delta l_2$$

and $$l_1' + l_2' = l_1 + l_2$$

Therefore, it will be evident that the total spring distortion will be equal to zero throughout the weighing range. In other words, the combination of leaf springs 12 will have a substantially constant spring rate, because there is no effective change in the combined bending length.

In FIG. 2, only the upper springs 12 have been shown with the designations $l_1$, $l_2$, $\Delta l_1$ and $\Delta l_2$, etc. for the purpose of brevity. It should be noted, however, that both upper and lower spring strips 12 of each parallelogram 20, 21 and 22, respectively, vary in the same manner.

As aforementioned, the particular spring configuration of four outer leafs and four inner leafs, is only a preferred embodiment of the invention. The concept of combining springs to provide a zero change in effective bending length, can be achieved by many other designs as well.

The drawings and description as they refer to this particular configuration, is considered to be exemplary in character, and is presented as only one way of practicing the subject invention.

The inventive scale 10 also includes a zero adjustment, and spring rate adjust compression spring 26 (FIG. 2). This spring is used to assist the return of the deflecting spring strips 12. The spring 26 can also compensate for manufacturing tolerances in leaf springs 12, by adding to the combined spring constant. Hence, by making spring 26 weaker or stronger (lesser or more turns), the overall spring rate of the scale can be easily adjusted.

The deflection of the leaf springs is measured and converted in electrical signals by the moire electrooptical apparatus 15. Such a measuring device is more particularly described in application Ser. No. 655,393, filed: Feb. 5, 1976, for a "Leaf Spring Weighing Scale with Optical Detector."

Of course, other deflection measuring devices may be used such as load cells, strain gages, etc.

All obvious modifications which will occur to those skilled in this art, are deemed to lie within those limits defining the scope and purview of this invention, as defined by the appended claims.

What is claimed is:

1. A twin leaf spring weighing scale having a combination of leaf springs that are arranged to provide a substantially constant spring rate throughout a scale weighing range, said weighing scale comprising:
    a support means;
    a weighing pan for receiving a load, said weighing pan moving through at least a portion of a weighing range in response to said load; and
    a first and second leaf spring means operatively connected together for forming and effectively functioning as a unitized leaf spring means, said weighing pan being supported by said first and second leaf spring means, said first and second leaf spring means being carried by said support means, said first leaf spring means having an effective bending length that increases with movement of the weighing pan through the weighing range in response to a load, said second leaf spring means having an effective bending length that correspondingly decreases with movement of the weighing pan through the weighing range in response to said load, the increasing effective bending length of said first leaf spring means being effectively, substantially cancelled by the decreasing effective bending length of said second leaf spring means, whereby the combination of said first and said second leaf spring means provides a leaf spring arrangement having a substantially constant spring rate throughout the weighing range.

2. The weighing scale of claim 1, further comprising a moire deflection measuring apparatus operatively connected between said support means and said first and second leaf spring means.

3. The weighing scale of claim 1, wherein said first and said second leaf spring means each form a parallelogram structure.

4. The weighing scale of claim 1, further comprising means for measuring the leaf spring movement, said measuring means being operatively connected between said support means and said first and second leaf spring means.

5. The weighing scale of claim 1, further comprising a zero adjustment means operatively connected between said support means and said first and second leaf spring means.

6. The weighing scale of claim 1, further comprising a spring rate adjusting means operatively connected between said support means and said first and second leaf spring means.

7. A multiple leaf spring weighing scale having a combination of leaf springs that are arranged to provide a substantially constant spring rate throughout a scale weighing range, said weighing scale comprising:
   a support means;
   a weighing pan for receiving a load, said weighing pan moving through at least a portion of a weighing range in response to said load; and
   a plurality of leaf springs operatively connected together for forming and effectively functioning as a unitized leaf spring means, said weighing pan being supported by said leaf springs, said leaf springs, said leaf springs being carried by said support means, a first portion of said unitized leaf spring means having an effective bending length that increases with movement of the weighing pan through the weighing range in response to a load, a second portion of said unitized leaf spring means having an effective bending length that correspondingly decreases with movement of the weighing pan through the weighing range in response to said load, the increasing effective bending length of said first portion of said unitized leaf spring means being effectively, substantially cancelled by the decreasing effective bending length of said second portion of said unitized leaf spring means, whereby the unitized leaf spring means has a substantially constant spring rate throughout the weighing range.

8. The weighing scale of claim 7, further comprising a moire deflecttion measuring apparatus operatively connected between said support means and said unitized leaf spring means.

9. The weighing scale of claim 7, wherein said unitized leaf spring means comprises a parallelogram leaf spring structure.

10. The weighing scale of claim 7, further comprising means for measuring the movement of the leaf springs of said unitized leaf spring means, said measuring means being operatively connected between said support means and said leaf springs of said unitized leaf spring means.

11. The weighing scale of claim 7, further comprising a zero adjustment means operatively connected between said support means and said unitized leaf spring means.

12. The weighing scale of claim 7, further comprising a spring rate adjusting means operatively connected between said support means and said unitized leaf spring means.

* * * * *